US011128205B2

(12) United States Patent
Ponzio et al.

(10) Patent No.: US 11,128,205 B2
(45) Date of Patent: Sep. 21, 2021

(54) APPARATUS FOR ALIGNING WIRE CONDUCTORS EXTENDING FROM COIL MEMBERS INSERTED IN SLOTS OF A CORE OF A DYNAMO ELECTRIC MACHINE

(71) Applicant: ATOP S.p.A., Florence (IT)

(72) Inventors: Massimo Ponzio, Siena (IT); Rubino Corbinelli, Staggia Senese (IT)

(73) Assignee: ATOP S.p.A., Florence (IT)

( * ) Notice: Subject to any disclaimer, the term of this patent is extended or adjusted under 35 U.S.C. 154(b) by 238 days.

(21) Appl. No.: 16/500,339

(22) PCT Filed: Mar. 29, 2018

(86) PCT No.: PCT/IB2018/052164
§ 371 (c)(1),
(2) Date: Oct. 2, 2019

(87) PCT Pub. No.: WO2018/185620
PCT Pub. Date: Oct. 11, 2018

(65) Prior Publication Data
US 2021/0104940 A1 Apr. 8, 2021

(30) Foreign Application Priority Data

Apr. 3, 2017 (IT) .......................... 102017000036222

(51) Int. Cl.
*H02K 15/00* (2006.01)
*B23K 26/21* (2014.01)
*B21D 39/03* (2006.01)

(52) U.S. Cl.
CPC ......... *H02K 15/0081* (2013.01); *B21D 39/03* (2013.01); *B23K 26/21* (2015.10)

(58) Field of Classification Search
CPC ..... B21D 39/03; B23K 25/21; H02K 19/0081
See application file for complete search history.

(56) References Cited

U.S. PATENT DOCUMENTS

2006/0001327 A1 1/2006 Ossenkopp et al.
2014/0300239 A1 10/2014 Takizawa et al.

FOREIGN PATENT DOCUMENTS

EP 1 041 696 10/2000
FR 2 845 536 4/2004
WO WO 2012/119691 9/2012

*Primary Examiner* — Carl J Arbes
(74) *Attorney, Agent, or Firm* — Jeffrey H. Ingerman; Jason S. Ingerman; Haley Guiliano LLP

(57) ABSTRACT

The apparatus and process relate to aligning ends of wire conductors extending from coil members inserted in slots of a core (10) of a dynamo electric machine to join the ends of at least two wire conductors (EP1, EP2, EP3, EP4, EP5) by means of a welding operation; wherein the ends to be joined are aligned along radiuses (R1, R2) of the core (10), and wherein spacing (S1, S2) exists between two adjacent radiuses (R1, R2) of the core (10). This apparatus and this process provide for a first alignment unit (120) to which the following steps are made to be performed: positioning a first member (25) in a first spacing (S1) existing on one side of a first radius (R1) of said core (10); positioning a first abutment portion (23', 33') at a first position situated radially between a first group of ends (EP1) to be joined and a second group of ends (E2) to be joined, said first and second group of ends being aligned along said first radius (R1); positioning a second member (35) in a second spacing (S2) existing on the opposite side of the first radius (R1); positioning a second abutment portion (33', 23') at a second position situated radially between said first group of ends (EP1) to be joined and said second group of ends (E2) to be joined; positioning a first pusher (41) at a radially outer position relative to said core (10) for pushing said first group of ends (EP1) to be joined against said first abutment portion (23', 33'); positioning a second pusher (42) at a radially inner position relative to said core (10) for pushing said second group of ends (EP2) to be joined against said second (Continued)

abutment portion (33', 23'); arranging first means (302, 308) configured for relatively moving the first member (25), the second member (35), the first abutment portion (23', 33') and the second abutment portion (33', 23') in an axial direction (Z, Z') of the core (10); arranging second means (200) configured for relatively moving the first radial pusher (41) and the second radial pusher (42) in the radial direction (R, R') of the core (10); arranging third means (100) configured for moving the first member (25) and the second member (35) one towards the other in a circumferential direction (CS, CS') of the core (10).

18 Claims, 7 Drawing Sheets

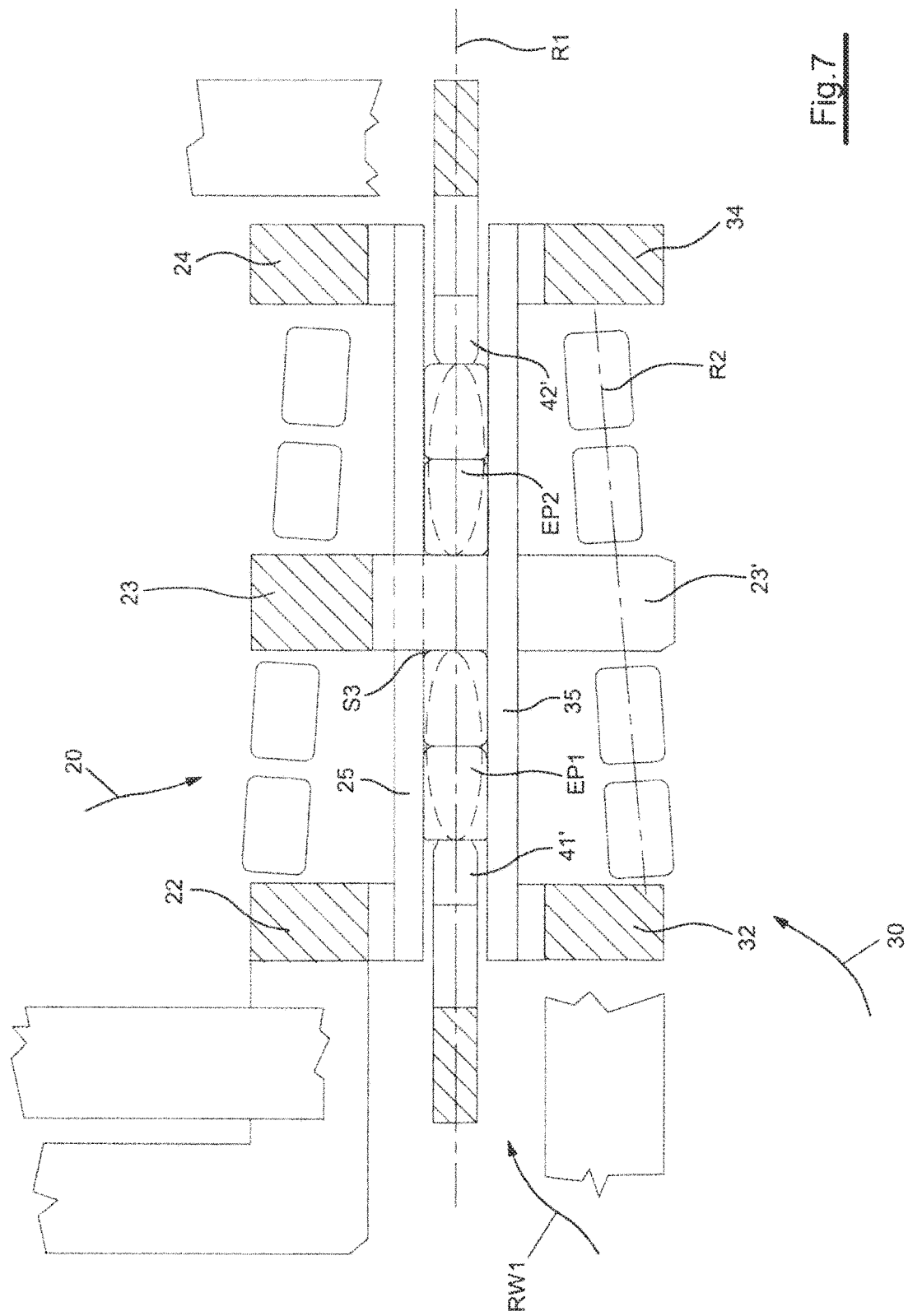

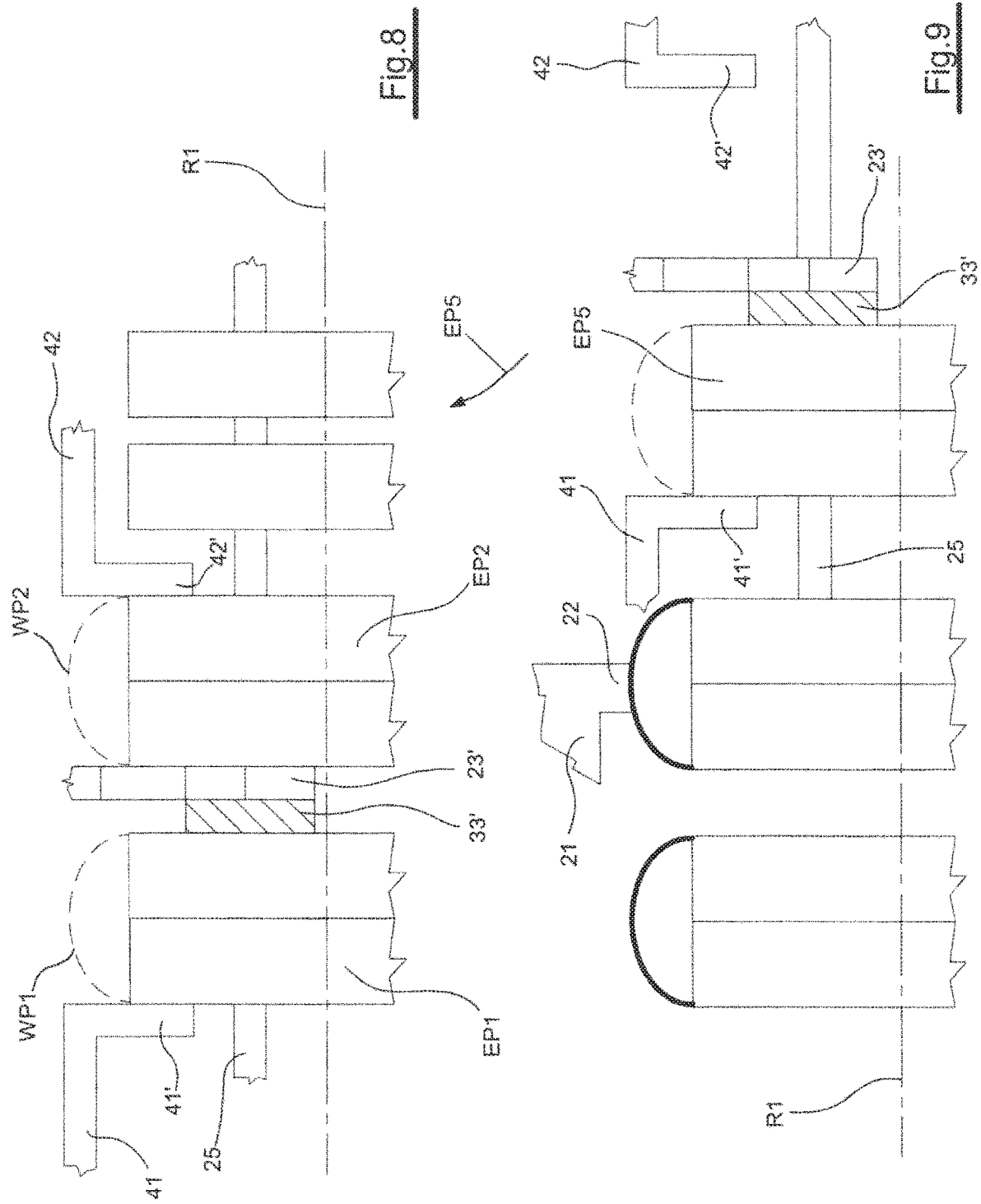

APPARATUS FOR ALIGNING WIRE CONDUCTORS EXTENDING FROM COIL MEMBERS INSERTED IN SLOTS OF A CORE OF A DYNAMO ELECTRIC MACHINE

TECHNICAL FIELD

The present invention relates to apparatuses and processes for aligning wire conductors extending from coil members inserted in slots of a core of a dynamo electric machine.

BACKGROUND OF THE INVENTION

It is known in the art to use apparatuses and processes adapted to weld together the ends of pairs of conductors, wherein each conductor belongs to a coil member. Said members are inserted in slots of a core of an electric dynamo machine. Coil members of this type can be those having a fork like shape, normally referred to as "U shaped coil members" or "hairpins" in the art.

WO publication 2012/119691 describes apparatuses and processes adapted to weld together coil members like the U shaped coil members or hairpins.

The welding operation can be carried out by using a laser beam, or by resistance heating, in order to melt and thereby join the pairs of conductors. The resulting connection joint needs to have specific mechanical and electrical characteristics.

Typical manufacturing scenarios for producing cores having these welding operations are those for producing wound stators wound with hairpin coil members of electric drives or hybrid drives of automotive vehicles.

A fundamental requirement of the welding operations is the accurate and repeatable positioning of the ends of the pairs of conductors with respect to a welder tool, like the laser beam, which needs to be directed on the ends of the pairs of conductors to produce the connection joint of the weld.

In addition, the constant increase in the number of electric and hybrid drives of many different types of vehicles requires that the manufacturing scenario be easily adapted to processing variations in the configuration of the stators.

Therefore, the welding operations have the requirement of being easily adapted for positioning ends of the pairs of conductors with respect to the welding tool. In particular, the solutions for positioning the ends of the pairs of conductors need to cope with variations in their position due to the different winding and size characteristics of the stator types.

Also, the positioning solutions of the ends of the pairs of conductors must occupy less space and apply greater straightening force on the conductors without damaging the conductors' insulation. This is particularly the case for recent stators, which present less available space between the ends of the pairs of conductors for the positioning solutions.

Furthermore, the increased hourly production of these stators continues to require a reduction in the time available for performing the welding operation. This leaves less time for carrying out the alignment of the ends of the pairs of conductors.

OBJECT OF THE INVENTION

It is an object of the invention to align the ends of the pairs of conductors so that that the alignment with the welding tool occurs with a high degree of accuracy, in order produce high quality wound stators.

It is another object of the invention to maintain the ends of the pairs of conductors in the proper position during and after the alignment step for performing the welding operation.

It is a further object of the present invention to carry out the alignment quickly for a large number of ends of the pairs of conductors.

It is yet another object of the present invention to prevent the conductors from being damaged from excessive alignment stresses.

It is another object of the invention to carry out the alignment for differently configured stators, which may differ in the size or position of the ends of the pairs of conductors that need to be aligned.

It is a further object of the present invention to use simple parts for the alignment that can be quickly adapted when requiring to align ends of the pairs of conductors of differently configured stators.

These objects are achieved by the present invention with an apparatus and a method according to the appended independent claims for aligning ends of wire conductors extending from portions of coil members inserted in the slots of a core of an electric dynamo machine to join the ends of the wire conductors by means of a welding operation.

Further preferred and advantageous features of the invention are set out in the dependent claims.

These and other objects and advantages of the invention will also become apparent from the following detailed description, which is only provided by way of non-limiting examples, with reference to the annexed drawings,

BRIEF DESCRIPTION OF THE DRAWINGS

In FIG. 1 certain parts have been omitted for reasons of clarity.

In FIG. 4 certain parts have been omitted for reasons of clarity In FIG. 5, certain parts have been omitted for reasons of clarity.

FIG. 6 shows certain parts which have been omitted in FIG. 4.

FIG. 7 is a view similar to the view of FIG. 6 showing a further embodiment of the invention.

FIG. 8 is a view similar to the view of FIG. 5 showing a further embodiment of the invention. In FIG. 8 certain parts have been omitted for reasons of clarity.

FIG. 9 is a view similar to the view of FIG. 8.

DETAILED DESCRIPTION OF THE INVENTION

Figure 1:
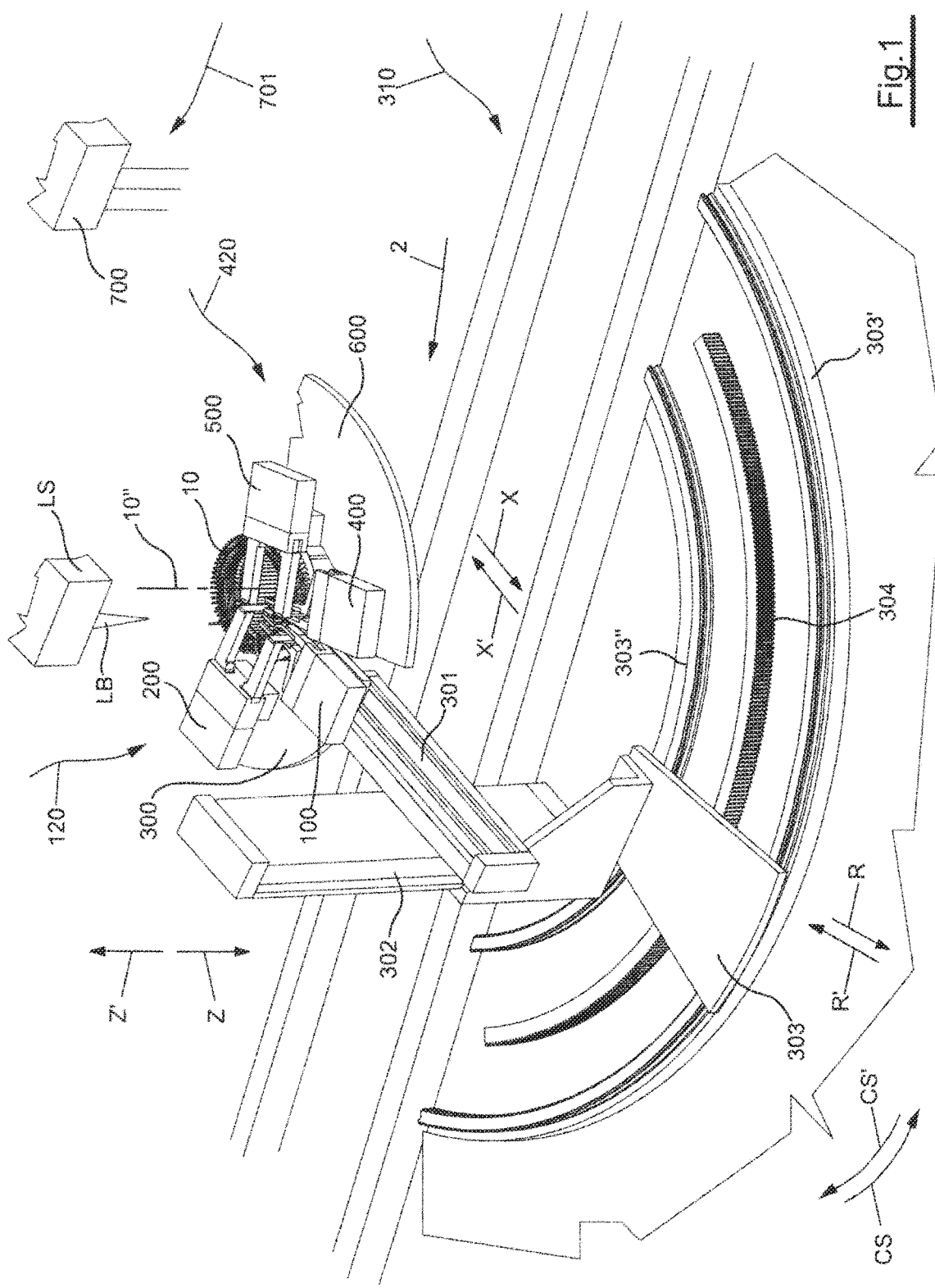
FIG. 1 is a perspective view of an embodiment of an alignment assembly according to the principles of the invention.
Figure 2:
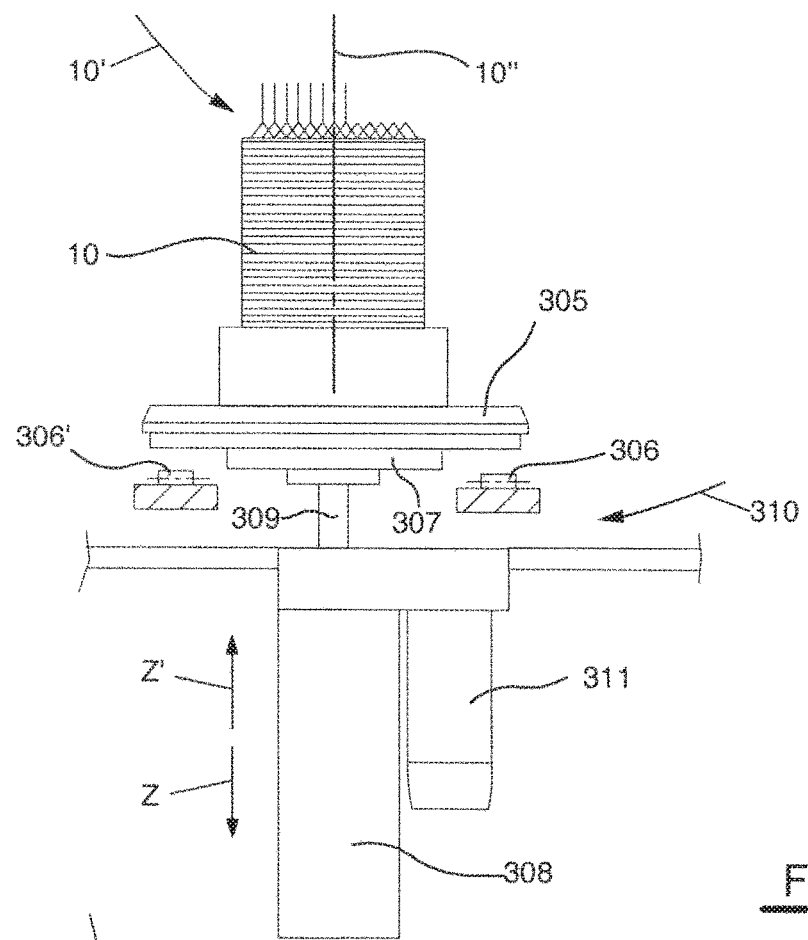
FIG. 2 is a schematic elevation view from direction 2 of FIG. 1.
Figure 3:
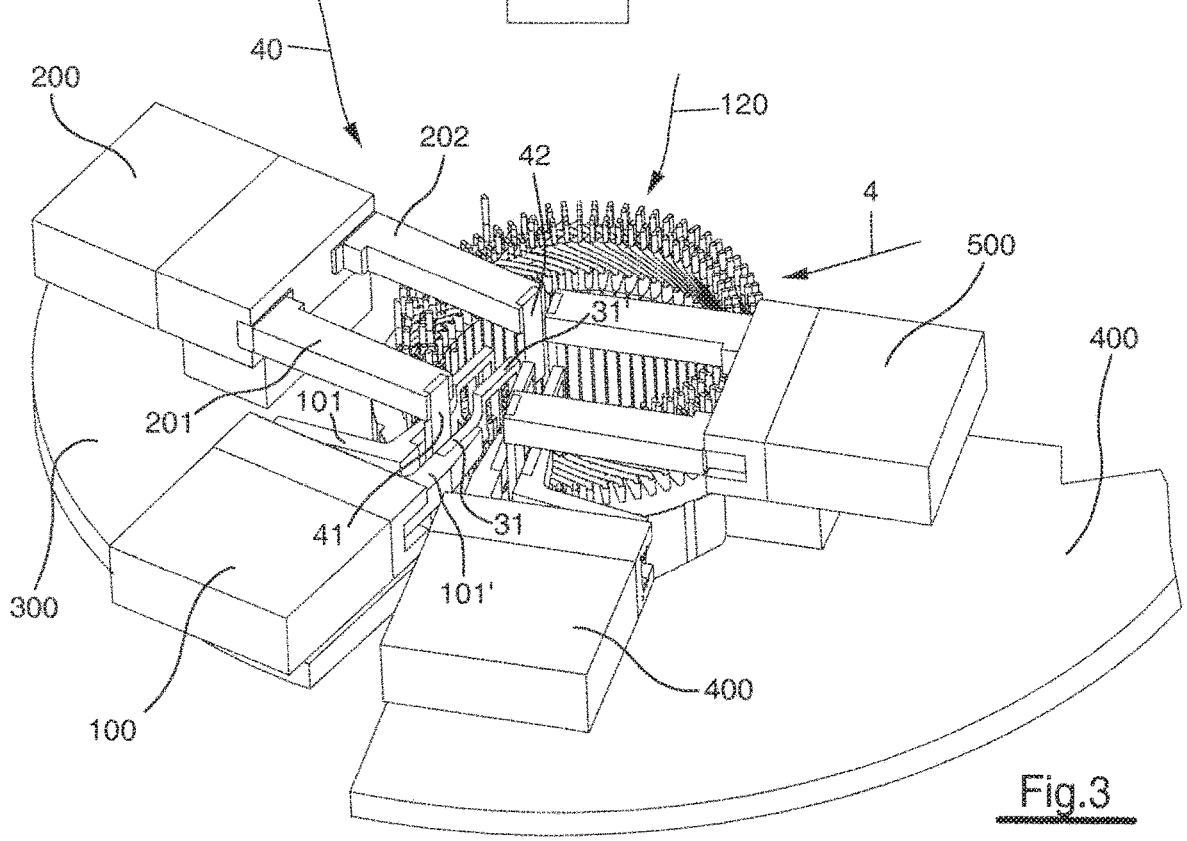
FIG. 3 is an enlarged view of the central area of FIG. 2.

With reference to FIGS. 1, 2 and 3, a wound core consists of a stator 10 with ends of the hairpin 10' that have been twisted to result adjacent to each other in pairs prior to being welded. Axial axis 10" is a longitudinal axis, which passes through the center of the stator 10.

With reference to FIGS. 4-7, the adjacent ends of hairpins 10' that require welding can be considered individually as a pair of ends EP1, EP2, EP3, EP4 positioned along respective radiuses of the core like R1 and R2.

The number of pairs of ends present on a same radius depends on the type of stator being manufactured. In the present example, of FIGS. 1-7, the pairs of ends of a radius are two, like EP1 and EP2 of radius R1 and EP3 and EP4 of radius R2, where R1 and R2 are adjacent radiuses around axial axis 10", as shown in the figures, like FIG. 6.

In order to accomplish the welding operation, the pairs of ends EP1, EP2, EP3, EP4 need to be accurately positioned on the specific radius to which they belong, for example radius R1 (for the pairs EP1 and EP2) and radius R2 (for the pairs EP3 and EP3). Furthermore, the pairs of ends like EP1 and EP2 need to be positioned at a predetermined coordinate along the specific radius, like R1.

Figure 5:
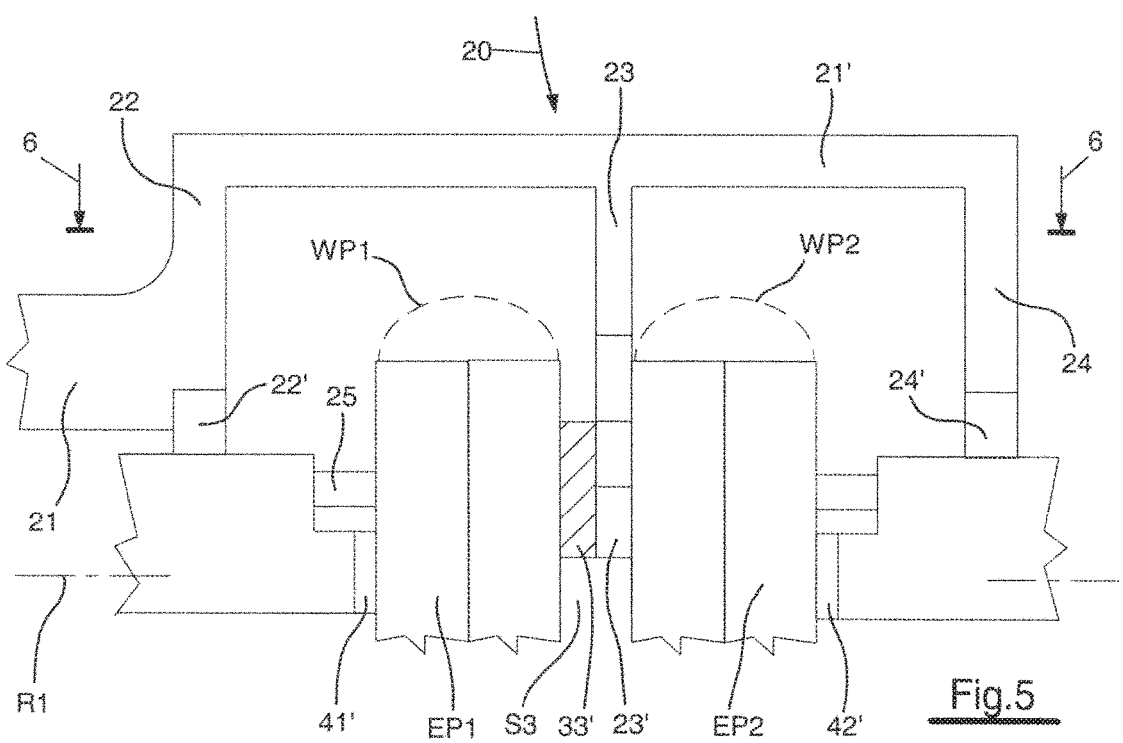
FIG. 5 is a partial elevation view from the directions 5-5 of FIG. 4.
Figure 6:
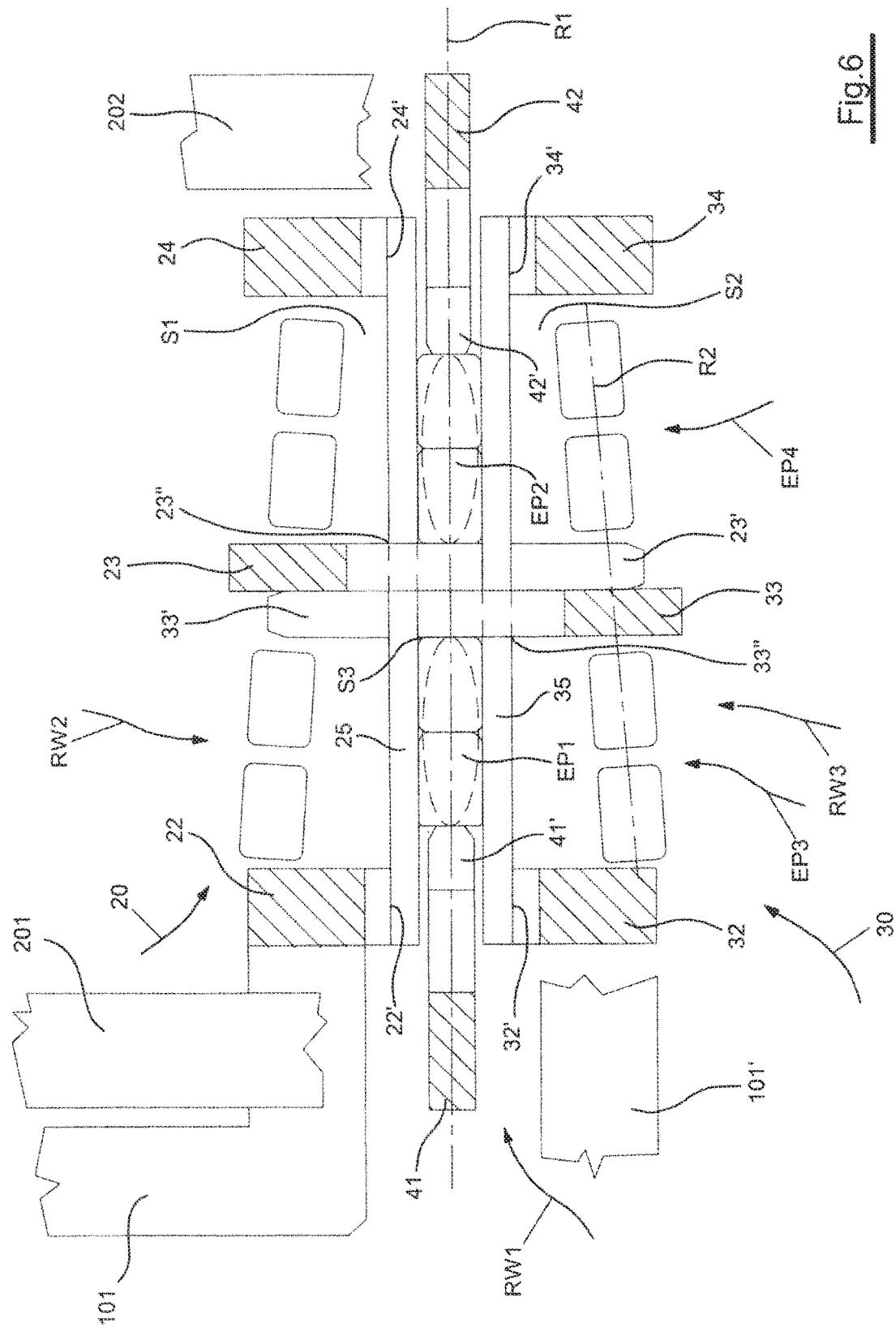
FIG. 6 is partial section view from the directions 6-6 of FIG. 3.

The welding operation melts the terminal portions of the ends of adjacent hairpins to form a connection joint for each pair of ends, like the weld joints outlined with dash line representation WP1 and WP2 shown in FIGS. 5, 6 and 7. In the final use of the stator, the connection joint has to resist mechanical forces and conduct electric current.

In the embodiment shown in the figures cited above, the cross sections of the ends of the pairs need to be orientated on a specific radius, like R1, without being rotated. Therefore, the sides of the cross sections of EP1, EP2, EP3 and EP4 need to have a planar contact, and result oriented perpendicularly to the radiuses, like is the situation shown in FIGS. 4-7.

Furthermore, the section of the hairpin conductors is normally rectangular, as is shown in the figures of the present description, however the section of the ends can be, for example square or circular.

In the following, pairs of the ends present on a same specific radius, like pairs EP1 and EP2 on radius R1, will be referred to as being a row of ends RW1, like is shown in FIG. 6. Therefore, the meaning of row is to be understood as "radial row".

With particular reference to FIGS. 1, 3, 4 and 5, first alignment unit 120 is provided with a first alignment assembly 20 having support arm 21 for aligning a row of ends, like row of ends RW1.

More particularly, first alignment assembly 20 is connected to arm 101 of actuator 100 by means of support arm 21. Support arm 21 is provided with extension portions 22, 23 and 24 having an L shape and extending from radial portion 21' of support arm 21. Extension portions 22, 23 and 24 are respectively provided with end portions 22', 23' and 24'.

In the embodiment shown in FIGS. 1, 3, 4 and 5, the lateral end portions 22' and 24' are situated on opposed parts with respect to the central end portion 23'.

Figure 4:
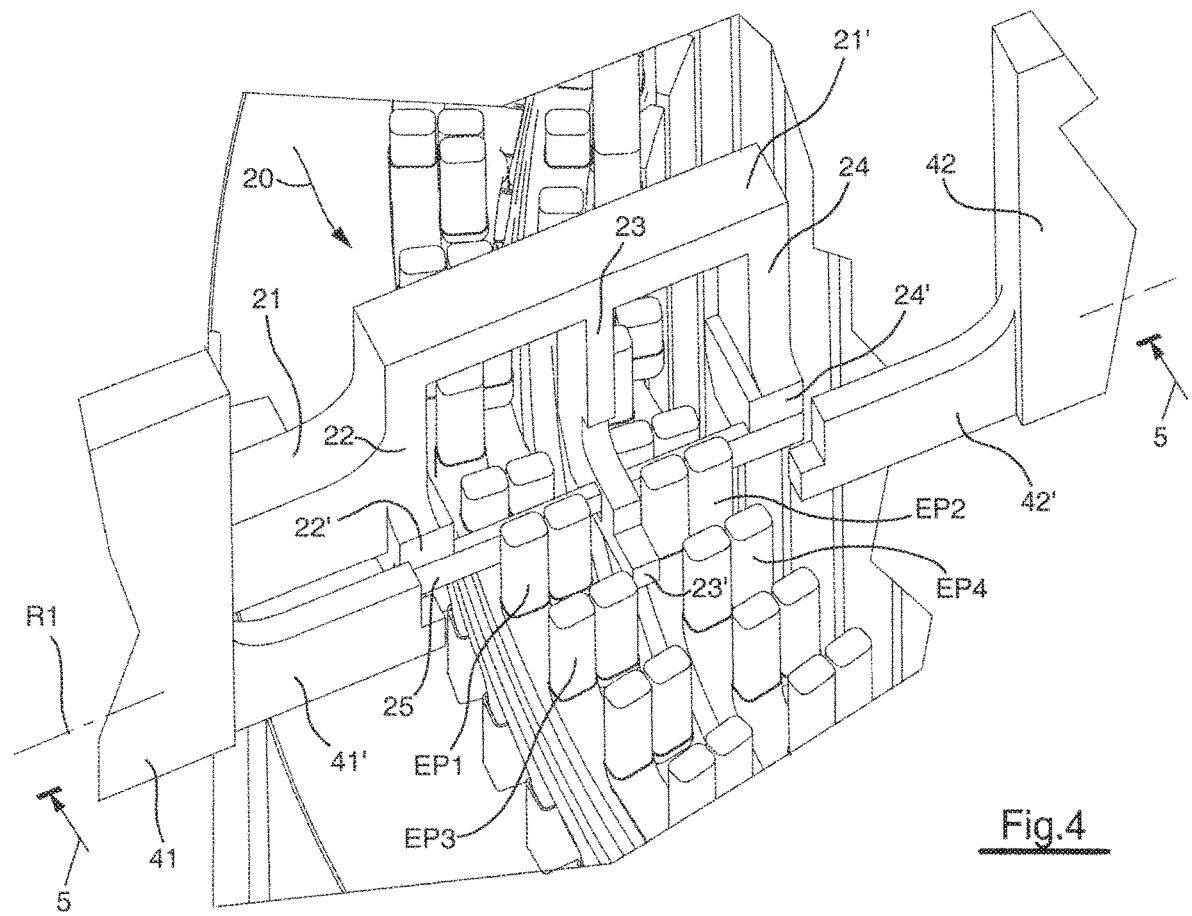
FIG. 4 is a partial perspective view from direction 4 of FIG. 3.

First plate 25 is a first member of first alignment assembly 20 for engaging pair of ends of a row of ends RW1 that need to be aligned for the welding operations. First plate 25 is attached to end portions 22' and 24'. First plate 25 passes through slot 23" of end portion 23'. In this way end portions 23' crosses under first plate 25, as shown in FIGS. 4, 5 and 6.

As cited above the central end portion 33' is situated centrally with respect to the lateral end portions 32' and 34'. Moreover, end portion 23' is longer than end portions 22' and 24', like is shown in FIGS. 4 and 6. End portions 22', 23' and 24', together with first plate 25 are sized to be received in spacing S1 existing between rows RW1 and RW2 of end portions of the conductor that need to be joined. End portion 23' is also received in spacing S3 existing between pairs of ends, like EP1 and EP2, of the same radius, like R1.

In this situation, the terminal part of end portion 23' results positioned on radius R1 and beyond. In particular, the terminal part of end portion 23' results positioned in spacing S3, adjacent to pair of ends EP1, EP2, which need to be aligned by first alignment assembly 20, as shown in FIGS. 4, 5, 6 and 7.

With particular reference to FIGS. 3, 6 and 7, first alignment unit 120 is also provided with second alignment assembly 30 having support arm 31. More particularly, second alignment assembly 30 is connected to arm 101' of actuator 100 by means of support arm 31. Extension arms 32, 33 and 34, having an L shape, extend from support arm 31, as shown in FIGS. 3 and 6, in particular from a radial portion 31' belonging to such support arm 31. Extension arms 32, 33 and 34 are respectively provided with end portions 32', 33' and 34'.

Lateral end portions 32' and 34' are situated at opposed parts with respect to the central end portion 33'.

Second plate 35 is a second member belonging to second alignment assembly 30, and is also configured for engaging the pairs of end of row RW1. Second plate 35 is attached to end portions 32' and 34', as shown in FIGS. 6 and 7. Second plate 35 passes through slot 33" of end portion 33'. In this way end portion 33' crosses under second plate 35, as shown in FIG. 6.

As cited above, the central end portion 33' is situated centrally with respect to the lateral end portions 32' and 34'. Furthermore, end portion 33' is longer than end portions 32' and 34'. End portions 32', 33' and 34' together with second plate 35 are sized to be received in spacing S2 existing between row RW1 and a further row of pairs of ends that need to be joined, like RW3 shown in FIG. 6. End portion 33' is also received in spacing existing between pairs of ends, like EP1 and EP2, of the same radius, like R1, as shown in FIG. 6.

In this situation, the terminal part of end portion 33' results positioned on radius R1. In particular, the terminal part of end portion 33' results positioned adjacent to pair of ends EP1 and EP2, which need to be aligned, as shown in FIG. 6.

The terminal part of end portion 23' and the terminal part of end portion 33' have a step configuration, as shown by way of a non-limiting example in FIGS. 4, 5 and 6. This is necessary to allow plate 25 to be positioned over the terminal part of end portion 33', and that plate 35 be positioned over the terminal part of end portion 23', as shown in FIG. 6. In FIGS. 4, 5 and 6 end portion 23' is shown adjacent to pairs of conductors EP2, and end portion 33' is shown adjacent to pairs of conductors EP1. This is due to the position where extension arms 23 and 33 are attached along the radial portions 21' and 31' of support arms 21' and 31'. In fact, extension arm 23 is nearer to the axial axis 10" than extension arm 33. This situation described above can be inverted by attaching extension arm 33 to the radial portion 31' of the support arm 31 in line with where extension arm 23 is attached to the radial portion of the support arm 21', and attaching extension arm 23 to the radial portion 21' of support arm 21 in line with where extension arm 33 is attached to the radial portion 31' of support arm 31. As a result, end portion 23' becomes adjacent to pairs of ends EP1, and end portion 33' becomes adjacent to pairs of ends EP2

With reference to FIGS. 3-6, first alignment unit 120 is also provided with a radial pushing assembly 40. Radial pushing assembly 40 is provided with two arms 41, 42, respectively connected to arms 201 and 202 of actuator 200. Arms 41 and 42 have an L shape, as shown in FIG. 4.

With reference to FIGS. 4, 5 and 6, end portion 41' of arm 41 is positioned on radius R1 in alignment and adjacent to pair of ends EP1, whilst end portion 42' of arm 42 is positioned on radius R1 in alignment and adjacent to pair of ends EP2.

Actuator 100, when actuated to align the end of the conductors, moves support arm 21 and support arm 31 to move plate 25 and plate 35 towards each other in circumferential directions CS and CS' of the stator. This movement causes first plate 25 and second plate 35 to engage and move pairs of ends EP1 and EP2. In this way, pairs of ends EP1 and EP2 recover any misalignment, and result positioned on radius R1, like is shown in FIG. 6. This is the final alignment position required for welding.

With reference to FIG. 6, actuator 200 is actuated to align the pairs of ends at a precise coordinate along a radius like R1. Actuator 200 provides movement of arm 41 and arm 42 to cause end portion 41' and end portion 42' to move towards each other in the radial direction R and R' of the core. This radial movement causes end portion 41' and end portion 42', respectively to engage and move pairs of ends EP1 and EP2 along radius R1. Furthermore, this movement brings pairs of ends EP1 and EP2 to be respectively engaged with the terminal part of end portion 33' and the terminal part of end portion 23', as shown in FIGS. 5 and 6.

In this way, end portions EP1 and EP2 result accurately positioned at the required coordinate on radius R1, like is required for applying the laser beam LB to perform the welding operation.

As shown in FIGS. 1 and 3, actuators 100 and 200 are fixed to support plate 300. Support plate 300 is fixed to the end of actuator 301, which can move support plate 300 in directions X and X'. Actuator 301 is fixed to actuator 302. Actuator 302 can move in directions Z and Z'. Actuator 302 is fixed to carriage 303, which can move actuator 302 in circumferential direction CS and CS' of the stator 10. Carriage 303 runs on guides 303' and 303" to move in circumferential direction CS and CS' by means of an actuator, which is not shown for reasons of clarity. The actuator engages circular rack 304.

Guides 303' and 303" have circular trajectories, which are centered on axial axis 10" of stator 10, when stator 10 is positioned in relation to first alignment unit 120. Actuators 301 and 302 are positioned with respect to carriage 303 so that direction X and X' intersect axial axis 10" of stator 10. In this way, directions X and X' are parallel to the radiuses like R1 and R2 of the rows RW1, RW3. Similarly, directions Z and Z' are parallel to the axial axis 10" of stator 10.

As shown in FIG. 2, a stator 10 that needs to be positioned in relation to first alignment unit 120 can be travelling on a transport pallet 305 moved by conveyor 310. More particularly, stator 10 is positioned in relation to first alignment unit 120 by supporting the transport pallet 305 carrying stator 10 on platform 307. In fact, platform 307 can engage transport pallet 305 when pallet 305 rests on conveyor tracks 306 and 306' of conveyor 310. Movement of platform 307 in direction Z' lifts transport pallet 305 off conveyor tracks 306 and 306' to bring transport pallet 305 to the raised position shown in FIG. 2. This movement is made possible by linear actuator 308, which moves shaft 309 in direction Z'. Furthermore, in the position shown in FIG. 2, shaft 309 can be rotated around axial axis 10" by motor and transmission 311. This rotation rotates platform 307, thereby rotating transport pallet 305 together with stator 10 around axial axis 10".

In this way, support plate 300 can be moved in a plane with two degree of freedom to achieve movements in circumferential directions CS and CS' and directions X and X', which respectively correspond to movements around axial axis 10" of the stator and in radial directions R and R' of the stator.

By commanding actuator 302 to move in direction Z, support plate 300 can be moved towards stator 10 to position first plate 25 and second plate 35 in spacing S1 and S2, and end portions 41' and 42' adjacent to stator 10 in preparation for reaching the alignment condition shown in FIG. 6.

By commanding actuator 302 to move in direction Z', support plate 300 can be moved away from stator 10 in order to remove first plate 25 and second plate 35 from spacing S1 and S2, and end portions 41' and 42' away from stator 10. This will make it possible to rotate stator 10 around axis 10" by means of motor transmission 311 to position further spacing like S1 and S2 for alignment of other pairs of ends, like EP3 and EP4.

FIG. 7 shows a second embodiment where only extension arm 23 and terminal part of end portion 23' is present for being positioned in spacing S3 between and adjacent to end portions EP1 and EP2. As shown in FIG. 7, end portion 23' is engaged by end portions EP1 and EP2, when end portion 41' and end portion 42' move towards each other in the radial direction of the stator to reach the alignment condition.

FIGS. 1 and 3 show the presence of a second alignment unit 420 consisting of a second support plate 600 for supporting actuator 400 and actuator 500. Actuator 400 moves tools members like plates 25 and 35 of alignment assembly 120 for the alignment in directions CS and CS' of further rows of pair of ends. Actuator 500 moves tool members like arms 41 and 42 for the alignment in the radial direction of the stator of further rows of ends. Support plate 600 can be moved in directions X, X' and Z, Z' by means of a second assembly, which not shown for reasons of clarity, for moving second support plate 600. This second assembly has actuators like 301, 302, and a carriage like 303. The carriage of this second assembly can run on guides 303' and 303" adjacent to carriage 303.

For reason of clarity, where necessary in the following, plates 25 and 35, and arms 41 and 42 of alignment unit 120 will be referred to as the first alignment tooling, whilst the similar members of alignment unit 420 will be referred to as the second alignment tooling.

In order to reduce the dead times required for the alignment operations, support plate 300 can be stationary in a temporal stage of aligning a row of ends during welding by using the first alignment tooling. At the same time, in other words simultaneously, support plate 400 can be in the condition of moving in directions CS to position the second alignment tooling for a next alignment.

Successively, support plate 400 can be in a next alignment condition for welding, while support plate 300 can be in the condition of moving in directions CS to position the first alignment tooling. In other words, first alignment unit 120 and second alignment unit 420 can be alternatively moving and aligning.

Figure 10:
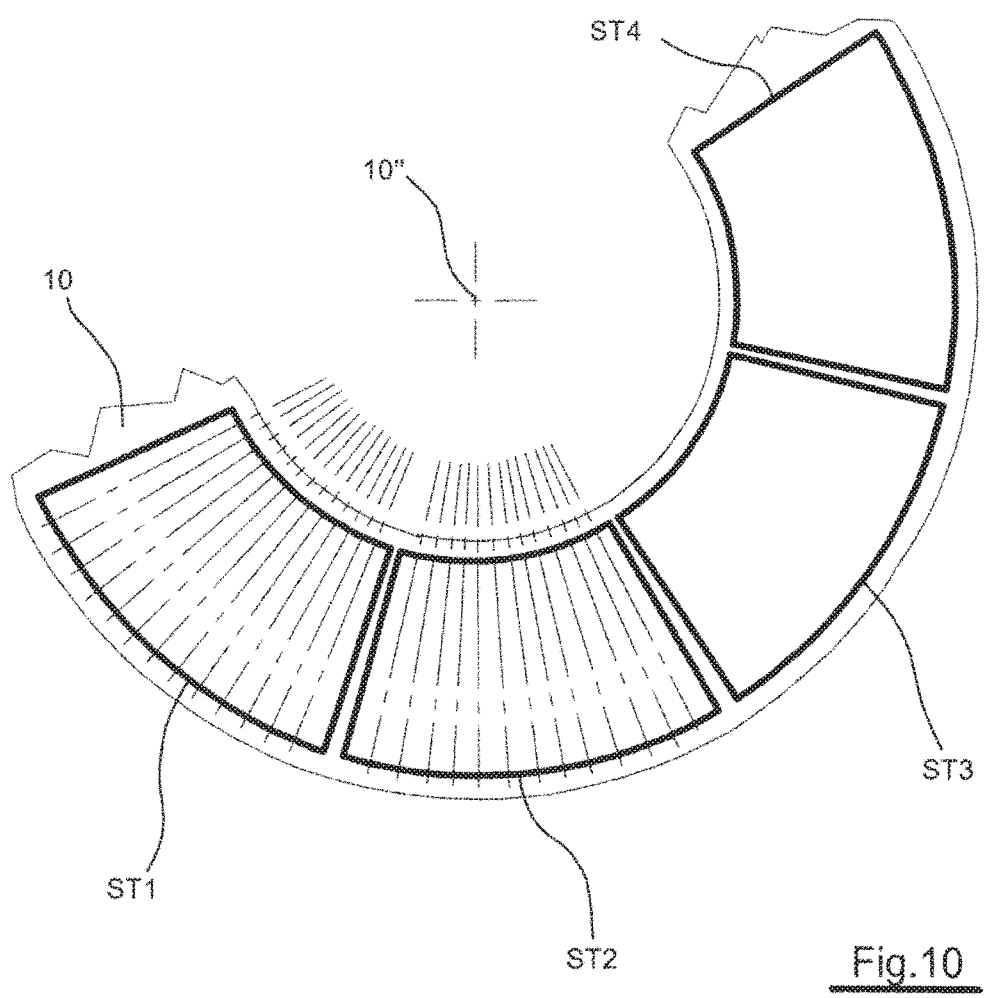
FIG. 10 is a schematic view of an end of a stator.

With reference to FIG. 10, alignment unit 120 can be assigned a first angular sector ST1 of adjacent rows of of ends to be aligned for welding, whilst alignment unit 420 can be assigned a second angular sector ST2 of adjacent rows of ends to be aligned for welding. The two sectors ST1 and ST2 can be adjacent to each other around axial axis 10" of stator 10. In FIG. 10, the adjacent rows are shown with the dash line representation of radiuses in sectors ST1 and ST2. The radiuses converge towards axial axis 10".

To accomplish the welding of all the rows of ends in sectors ST1 and ST2, laser system LS can move the laser beam LB from pairs of ends of sector ST1 to pairs of ends of sector ST2 by using a scanner solution, which uses commutated mirror deviation or reflection of the laser beam LB.

Once the welding operations have been completed for two sectors like ST1 and ST2, i.e. alignment unit 120 and alignment unit 420 have completed aligning the rows of ends of the two sectors ST1 and ST2, stator 10 can be rotated around central axis 10" by motor and transmission 311 of FIG. 2 to position two other sectors ST3 and ST4 with respect to alignment unit 120 and alignment unit 420. Therefore the first alignment unit 120 will perform the alignment in the rows of ends in the sector indicated ST3, while the second alignment unit 420 will perform the alignment in the rows of ends in the sector indicated ST4.

This working of two sectors at a time and indexing to align further sectors can be repeated until all the rows of ends of the stator have been welded. In this way, the laser system LS results stationary, and only the laser beam LB is moved by the scanning solution to weld in two sectors If the time available for alignment is long enough, only one alignment unit like 120 can be sufficient for alignment of all the rows of ends of the stator 10. In this case there can be an embodiment where the movement of carriage 303 to positon further rows of ends for alignment by the first tools can be substituted by rotating stator 10 around axial axis 10" using motor and transmission 311 of FIG. 2. In this situation actuator 302 can be supported by a stationary structure in place of carriage 303.

Furthermore, in an alternative embodiment, actuator 302 can be omitted, and the movement in directions Z and Z' for positioning the first alignment tooling and the second alignment tooling can be obtained by moving stator 10 in directions Z and Z' using linear actuator 308 of FIG. 2.

The movements in direction X and X' of support plates 300 and 600 are typically required for positioning the first alignment tooling and the second alignment tooling at different radial distances from the axial axis 10" of a stator. This is the required situation of different radial positions of the first alignment tooling and the second alignment tooling when changing the position of the pairs of ends for a different configuration of the stator. This different position requirement can achieved by programming different rotations angles for the actuator of carriage 300 and the actuator of the carriage of alignment unit 420. Furthermore, different rotations angles can be used for motor and transmission 311 to rotate the stator consistently around axial axis 10" for changing the sectors being welded.

The actuators and motors described in the foregoing can be controlled and driven by controls 700 shown in FIG. 1. The actuators and motors can be connected to controls 700 via command and power lines 701. Controls 700 can be programmed to accomplish the different movements of the actuators and motors when changes occur in the size of stator 10 and the position of the pairs of ends to be aligned for welding.

FIGS. 8 and 9 show a situation where stator 10 is provided with three pairs of ends EP1, EP2, EP5 to be aligned along a radius like R1.

As shown in FIGS. 8 and 9, the configuration of arms 41 and 42 needs to have a reversed L shape to allow end of arm 41' and end of arm 42' to be positioned between pairs of ends EP1, EP2, EP5 in order to push the pairs of ends against the terminal part of end portions 23', 33' for the alignment.

In the situation of FIGS. 8 and 9, two pairs of ends EP1, EP2, can be aligned and welded first, like is shown in FIG. 8. The two pairs EP1 and EP2 are pushed against terminal part of end portions 23', 33' for the alignment required to weld. After welding of EP1 and EP2, alignment can occur of pair of ends EP5. As shown in FIG. 9, plates 25 and 35 have been moved in the radial direction by moving support plate 300 in directions X', i.e. towards the axial axis 10" of stator 10 to align pair of ends EP5. Also, arms 41 and 42 have been moved in the radial direction, as shown in FIG. 9.

When causing movement of arms 41 and 42 for the radial alignment of pair of ends EP5, arm 42 does not push on pair of ends EP5, although it can move freely in the radial direction when a command is given to actuator 200 to move arm 41. In this situation, pair of ends EP5 are pushed against the terminal part of end portion 33' to reach the alignment, as shown in FIG. 9.

Naturally, without prejudice to the principle of the invention, the embodiments and constructional details may be widely varied with respect to what has been described and illustrated, purely by way of a non-limiting example, without thereby departing from the scope of the invention as defined in the accompanying claims.

The invention claimed is:

1. Apparatus for aligning ends of wire conductors extending from coil members inserted in slots of a core of a dynamo electric machine to join a plurality of ends of at least two wire conductors, in particular by a welding operation, wherein said ends to be joined are intended to be aligned along radiuses of said core, and wherein a spacing exists between two adjacent radiuses of said core, said apparatus comprising at least one first alignment unit having:
   a first member configured for being positioned in a first spacing existing on one side of a first radius of the core;
   a first abutment portion configured for being positioned at a first position situated radially between a first group of ends to be joined and a second group of ends to be joined, said first and second group of ends being intended to be aligned along said first radius;
   a second member configured for being positioned in a second spacing existing on the opposite side of said first radius;
   a second abutment portion configured for being positioned at a second position situated radially between said first group of ends to be joined and said second group of ends to be joined;
   a first pusher situated at a radially outer position relative to said core and configured for pushing said first group of ends to be joined against said first abutment portion;
   a second pusher situated at a radially inner position relative to said core and configured for pushing said second group of ends to be joined against said second abutment portion;
   a first actuator configured for relatively moving said first member, said second member, said first abutment portion and said second abutment portion in an axial direction of said core;
   a second actuator configured for relatively moving said first radial pusher and said second radial pusher in the radial direction of said core; and
   a third actuator configured for moving said first member and said second member one towards the other in the circumferential direction of said core.

2. Apparatus according to claim 1, further comprising a fourth actuator configured for moving said second actuator and said third actuator in a radial direction of the core.

3. Apparatus according to claim 1, further comprising a carriage configured for relatively moving said second actuator and said third actuator around the axial axis of the core.

4. Apparatus according to claim 1 wherein said first member and said first abutment portion are connected to said third actuator by a first arm.

5. Apparatus according to claim 1, wherein said second member and said second abutment portion are connected to said third actuator by a second arm.

6. Apparatus according to claim 4, wherein said first member and said first abutment portion extend from said first arm in a direction that is parallel to the axial axis of said core, and the first abutment portion crosses said first member.

7. Apparatus according to claim 5, wherein said second member and said second abutment portion extend from the second arm in a direction that is parallel to the axial axis of the core and the second abutment portion crosses the second member.

8. Apparatus according to claim 1 wherein said first alignment unit is configured for being positioned around said core for aligning a plurality of groups of ends adjacent to be joined and that are in a first angular sector of said core, said apparatus further comprising a second alignment unit configured for being positioned around said core for aligning a plurality of groups of ends adjacent to be joined and that are in a second angular sector of said core.

9. A method for aligning ends of wire conductors extending from coil members inserted in slots of a core of a dynamo electric machine to join a plurality of ends of at least two wire conductors, in particular by a welding operation, wherein said ends to be joined are intended to be aligned along radiuses of the core, and wherein a spacing exists between two adjacent radiuses of said core, said method comprising:
provide at least one first alignment unit;
positioning a first member in a first spacing existing on one side of a first radius of said core;
positioning a first abutment portion at a first position situated radially between a first group of ends to be joined and a second group of ends to be joined, said first and second group of ends being aligned along said first radius;
positioning a second member in a second spacing existing on the opposite side of the first radius;
positioning a second abutment portion at a second position situated radially between said first group of ends to be joined and said second group of ends to be joined;
positioning a first pusher at a radially outer position relative to said core for pushing said first group of ends to be joined against said first abutment portion;
positioning a second pusher at a radially inner position relative to said core for pushing said second group of ends to be joined against said second abutment portion;
arranging a first actuator configured for relatively moving the first member, the second member, the first abutment portion and the second abutment portion in an axial direction of the core;
arranging a second actuator configured for relatively moving the first radial pusher and the second radial pusher in the radial direction of the core;
arranging a third actuator configured for moving the first member and the second member one towards the other in a circumferential direction of the core.

10. The method according to claim 9, further comprising arranging a fourth actuator configured for moving the second actuator and the third actuator in a radial direction of said core.

11. The method according to claim 9, further comprising arranging a carriage configured for relatively moving said second actuator and said third actuator around the axial axis of the core.

12. The method according to claim 9, wherein the first member and the first abutment portion are connected to the third actuator by a first arm.

13. The method according to claim 9, wherein the second member and the second abutment portion are connected to the third actuator by a second arm.

14. The method according to claim 12, wherein the first member and the first abutment portion extend from the first arm in a direction that is parallel to the axial axis of the core and wherein the first abutment portion is configured to cross the first member.

15. The method according to claim 13, wherein the second member and the second abutment portion extend from the second arm in a direction that is parallel to the axial axis of the core and wherein the second abutment portion is configured to cross the second member.

16. The method according to claim 9, further comprising:
positioning said first alignment unit around the core for aligning a plurality of adjacent ends to be joined situated in a first angular sector of said core; and
positioning a second alignment unit around the core for aligning of a plurality of adjacent ends to be joined situated in a second angular sector of the core.

17. The method according to claim 16, further comprising:
aligning a group of adjacent ends to be joined situated in the first angular sector of the core by the first alignment unit;
simultaneously moving the second alignment unit and arranging it for subsequently aligning a group of adjacent ends to be joined situated in the second angular sector of the core.

18. The method according to claim 16, further comprising:
welding the first sector with a laser beam emitted by a laser source;
welding the second sector with the laser beam;
deviating the laser beam between the first sector and the second sector without moving the laser source to accomplish the welding; and
rotating the core for positioning third and fourth sectors for welding.

* * * * *